United States Patent [19]

Casey, Jr.

[11] Patent Number: 4,715,952
[45] Date of Patent: Dec. 29, 1987

[54] REVERSE OSMOSIS WATER PURIFICATION ELEMENT AND CARTRIDGE

[76] Inventor: Walter P. Casey, Jr., 5226 S. Topaz Rd., Las Vegas, Nev. 89120

[21] Appl. No.: 567,184

[22] Filed: Dec. 30, 1983

Related U.S. Application Data

[63] Continuation of Ser. No. 357,213, Mar. 11, 1982, abandoned.

[51] Int. Cl.⁴ ............................................. B01D 13/00
[52] U.S. Cl. ................................. 210/136; 210/321.8
[58] Field of Search ................ 210/489, 490, 497.01, 210/497.1, 506, 509, 136, 321.1, 323.2, 433.2

[56] References Cited

U.S. PATENT DOCUMENTS

| | | | |
|---|---|---|---|
| 3,133,132 | 5/1964 | Loeb et al. | 264/207 X |
| 3,344,214 | 9/1967 | Manjikian et al. | 264/217 X |
| 3,457,170 | 7/1969 | Havens | 210/490 X |
| 3,578,175 | 5/1971 | Manjikian | 210/489 |
| 3,616,929 | 11/1971 | Manjikian | 210/335 X |
| 3,682,318 | 8/1972 | Rigopulos | 210/321.1 |
| 3,691,068 | 9/1972 | Cross | 210/636 |
| 3,708,069 | 1/1973 | Clark | 210/321.1 X |
| 3,834,546 | 9/1974 | Brun et al. | 210/490 |
| 3,929,945 | 12/1975 | Thayer et al. | 264/41 |
| 3,953,334 | 4/1976 | Brun et al. | 210/321.1 |
| 4,177,031 | 12/1975 | Thayer et al. | 264/41 X |
| 4,210,533 | 7/1980 | Astl | 210/136 |

Primary Examiner—David Sadowski
Attorney, Agent, or Firm—Edward J. Quirk

[57] ABSTRACT

A reverse osmosis element consists of a long tubular plastic base having a plurality of elongate parallel channels in its exterior surface. A monofilament strand is wrapped or extruded helically around the surface of the base, and a semipermeable membrane is formed, e.g. by casting or extrusion, around the wrapped tube. The tubes are mounted in a hollow cylindrical housing on a manifold; a passageway for purified water extends through the membrane, along the channels to the interior of each element, from the interior of each element through the manifold to a collection chamber, and to a purified water outlet.

1 Claim, 11 Drawing Figures

REVERSE OSMOSIS WATER PURIFICATION ELEMENT AND CARTRIDGE

This is a continuation of application Ser. No. 357,213, filed Mar. 11, 1982, now abandoned.

BACKGROUND OF THE INVENTION

This invention relates to apparatus for removing impurities from liquids by reverse osmosis, and relates more particularly to an element configuration and method of manufacture thereof, and to a cartridge unit for mounting reverse osmosis purification elements.

In reverse osmosis purification systems, a pressurized fluid containing one or more undesired components is applied to the surface of a semipermeable membrane which results in a solvent portion of the fluid passing through the semipermeable membrane and a preponderance of the undesired components becoming more concentrated at the membrane surface. Reverse osmosis systems have been used for many purposes, including the provision of relatively small amounts of purified water for home usage. These systems have frequently employed one or more suitably housed membrane elements which are continuously contacted with mineral-containing water. Purified water (which may be thought of as a solvent) slowly permeates through the membrane and is collected in a storage tank, such as a bladder tank, for use on demand.

A variety of different supports for the semipermeable membrane and housings for the membrane elements have been used. Membrane elements frequently comprise a rigid tubular member around which is wrapped a spacing screen. A thin semipermeable membrane is then formed over the screen by casting or dipping the tubing into a solution of membrane-forming liquid, such as a cellulose acetate solution. Water passes through the cellulose acetate membrane and the screen, entering a center portion of the support tube, e.g., through perforations along the tube; pure water exits one end of the tube. Various methods and apparatus for applying semipermeable membrane layers to tubular units are known and form no part of the present invention. Examples of such method are found in Thayer et al, U.S. Pat. Nos. 3,929,945, and 4,177,031. Similarly, any semipermeable membrane film may be used in the apparatus of the invention, including the cellulose acetate films disclosed in Loeb et al, U.S. Pat. No. 3,133,132, and Manjikian, U.S. Pat. No. 3,344,214.

The particular invention is concerned first with a specific tubular semipermeable membrane element and a method of making the same, and secondly with a particular cartridge configuration for housing a plurality of tubular membrane elements. The elements consist of an elongate rigid tube member having a plurality of longitudinal channels or grooves extending along the entire length of the tube. The tube has a monofilament helically wrapped with about 0.5 mil spacing around its exterior surface. A semipermeable membrane film is mounted on the monofilament wrapping. The membrane is applied to the monofilament surface by applying a liquid solution of membrane-forming materials thereto in any conventional manner, e.g. by extrusion, casting, or dipping, and permitting the solvent to evaporate to leave a thin, rigid, relatively uniform film. The membrane support is manufactured by cutting a plurality of V-shaped grooves into the tube, and wrapping monofilament around the tube, e.g. on a lathe.

In the past, membranes have been cast or otherwise fixed over a base generally comprising a fabric or fibrous material. Because the base material has a plurality of "ends" which may extend randomly through the membrane after casting, a relatively high failure rate caused by imperfections or "holidays" in the membrane surface has been realized. The monofilament base of the present invention has led to a failure rate of elements well below that heretofore realized.

The membrane elements of the invention are particularly adapted for use in relatively small cartridges which are suited for home use. The housing is designed to provide as much membrane surface area as is practical for each unit of volume of the housing; this permits a relatively small unit which may be placed, for example, under a kitchen sink, but which still provides relatively high throughput. In addition, the housing design is particularly adapted to provide internal flow of impure water around the membrane elements to insure that impurities are swept away from the surface efficiently. The housing also includes a safety system to prevent the possibility of back pressure from a pressurized purified water tank from damaging the membrane in the event of a failure of line pressure of the impure water source. Since membrane elements must be replaced after certain periods of use, the cartridge of the invention is also designed for easy installation and replacement.

Accordingly, it is an object of the invention to provide a reverse osmosis membrane element which is easy to manufacture, has a relatively high throughput, and is subject to a relatively low failure rate. It is another object of the invention to provide a housing for mounting a plurality of membrane elements which is inexpensive, easy to assemble, and which protects the membrane elements from damage in the event of loss of line pressure in the water supply system. It is yet a further object of the invention to provide a housing which directs flow of impure liquid around the membrane elements in a manner of flush away impurities accumulating at the surface thereof. These and other objects of the invention will be apparent from the following detailed description of an embodiment thereof.

SUMMARY OF THE INVENTION

In a preferred sense, the invention comprises a membrane element having a base member comprising an elongate rigid plastic tube having a plurality of parallel grooves extending longitudinally along the surface thereof, an inert monofilament wrapped helically around the exterior surface of the tube, and a semipermeable membrane film supported on the monofilament. The monofilament wrappings are spaced from each other to permit purified water passing through the membrane to pass also through the wrappings and into the collecting grooves. The elements are prepared by cutting a plurality of parallel V-shaped grooves along the surface of a plastic tube, helically wrapping a monofilament member around the exterior surface of the groove leaving spaces between adjacent wraps, fastening the monofilament ends to the tubing member, and forming a film of semipermeable membrane around the entire exterior surface of the tube. A housing for the elements comprises a cylindrical housing defining a chamber having a water inlet, brine outlet, and purified water outlet, a plurality of hollow elongate tubular semipermeable membrane elements mounted therein, manifold means for collecting purified water interiorly of the membrane elements, and conduit means for passing purified water from the manifold means to the purified water outlet.

BRIEF DESCRIPTION OF THE DRAWINGS

The invention is best understood with reference to the drawings, in which.

DETAILED DESCRIPTION OF A PREFERRED EMBODIMENT

Figure 1:
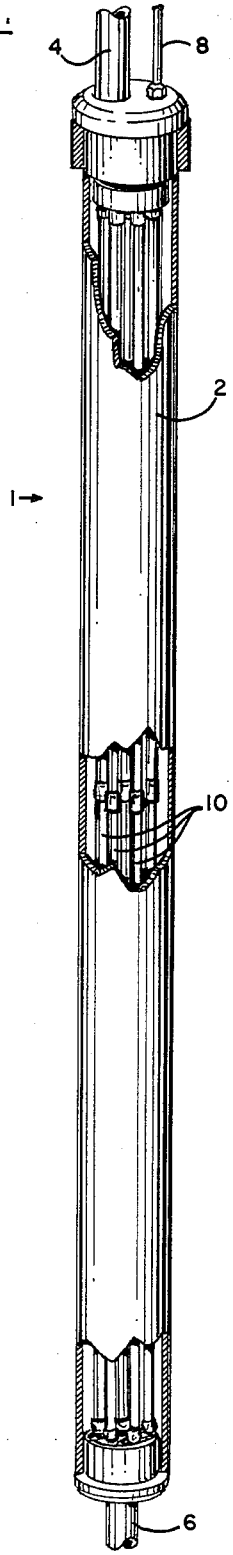
FIG. 1 is a partially cutaway view of a cartridge of the invention showing a plurality of tubes housed therein.
Figure 6:
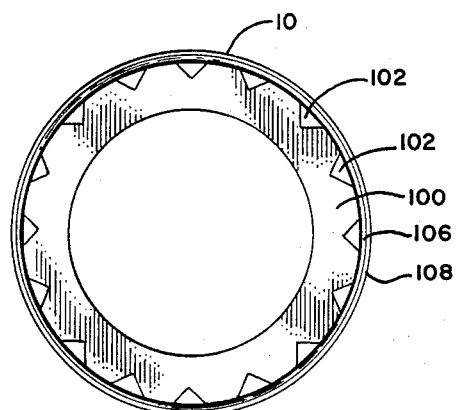
FIG. 6 is an end view of a membrane element of the invention.
Figure 7:
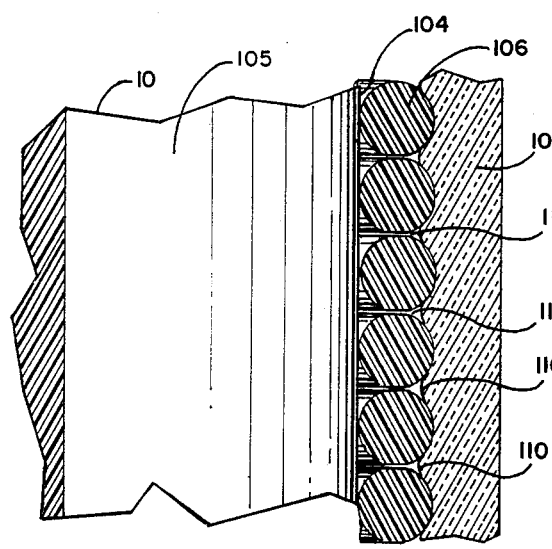
FIG. 7 is a greatly enlarged partial section view of a membrane element of the invention.
Figure 8:
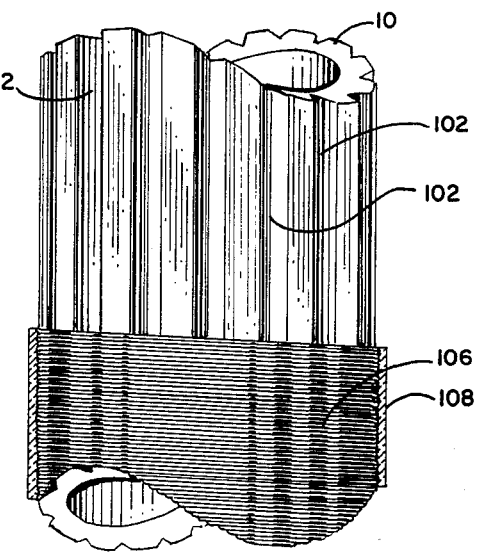
FIG. 8 is a partial exterior view of a partially wrapped membrane element of the invention.

The membrane elements which form building blocks of the reverse osmosis units of the invention are elongate tubular members designated generally as 10 in FIG. 1. Construction of these elements is best understood with reference to FIGS. 6, 7, and 8. Each membrane element 10 consists of a long hollow polyvinyl chloride (PVC) tube 100 having a plurality of parallel grooves or channels 102 located around the external periphery thereof. As shown, the grooves have a V-shaped cross-section, and extend along the entire length of the tube. While the dimensions of the tube are not critical to the invention, typical tubes are 12"–24" in length, with a 7/16" outside diameter and ¼" inside diameter. The wall thickness of the tube is not critical but should be sufficient to maintain the structural strength of the tube. The grooves are about 0.02" deep.

A monofilament strand 106 is wrapped helically around the exterior surface 104 of tube 10. The filament is wrapped to provide a generally uniform spacing 112 between each wrap around the tube. Preferably, the monofilament is 5 mil nylon strand, and is wrapped to provide a 0.5 mil spacing between the wraps. A membrane 108 having a thickness of about 3 mils is applied to the exterior surface of the wrapped tube by any conventional technology, such as extrusion, casting, or dipping. Application of the relatively viscous membrane-forming solution provides a slight intrusion 112 into the channels or spaces between the helical wrap of the monofilament. As best seen in the greatly enlarged section view of the tubing shown in FIG. 7, the membrane is slightly thicker at the portion where the membrane extends into the channels between the monofilament, designated by numeral 112. In actual practice, the basic membrane is 4–5 mils thick, with as much as 1 mil being attributed to the intrusion between the monofilament wraps.

The tube elements of the invention are easily manufactured by cutting the elongte parallel grooves along the length of conventional PVC tubing, wrapping the monofilament around the tube with a lathe, wrapping machine, or otherwise, and fixing the ends of the monofilament wrap such that the monofilament will not unwind upon usage. The loose monofilament ends can be easily attached in place by typing the ends, applying a cap, or fastening with an adhesive. The preferred method of maintaining the ends in place is to apply a very small amount of adhesive at each end of the tube to hold the end in place. Any suitable adhesive may be used; a viscous hot-melt thermoplastic or other adhesive which does not penetrate very far into the cavities between the fiber strands is preferred. Suitable hot-melt adhesives are marketed by 3M Company and United Shoe Company; no invention in the glue or method of attaching the end of the strand is claimed. A very fast drying non-viscous liquid adhesive such as Loctite Super Bonder 430 may also be used. A single drop of such liquid placed at each end of the tube during the wrapping process enables the wrapping to proceed rapidly without interruption. As noted earlier, any type of semipermeable membrane may be used, although the celulose acetate membranes which have had wide acceptance for reverse osmosis usage are preferred.

In use, impure water or other liquid under pressure is provided to the exterior surface of the tube. Purified fluid permeates the membrane and passes therethrough into the spaces 112 between the helical wraps, where it is collected in the elongate channels 102. Fluid then flows slowly along the channels to an end thereof where it passes through a collection system and into the interior 105 of the tube. Alternatively, the purified water collected in the grooves may pass directly into the interior of the tubes through a series of bores (not shown) along the bottom of each channel. A preferred form of collection system at the end of each tube is shown in FIGS. 2 and 9.

Figure 2:
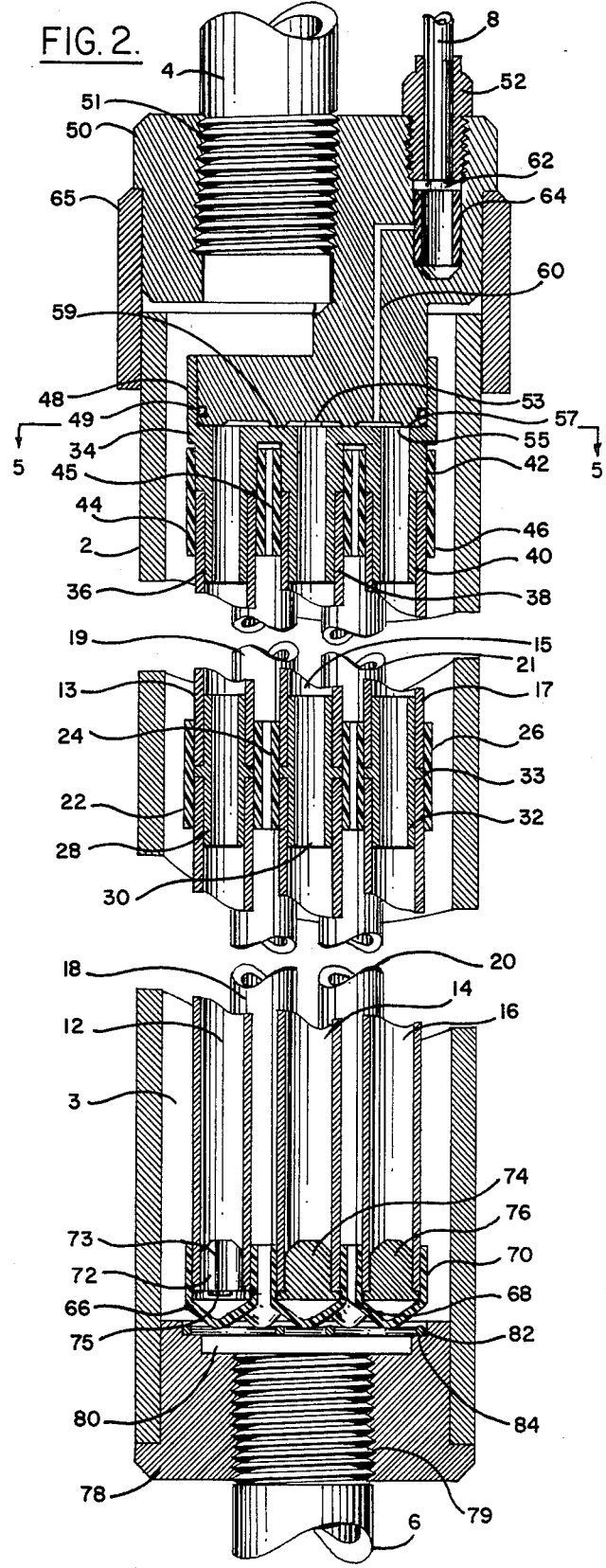
FIG. 2 is a side section view of a cartridge of the invention.
Figure 9:
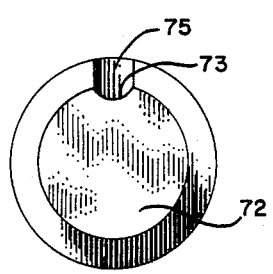
FIG. 9 is an end view of a plug member used to partially close off one end of the membrane elements.

Each tube is fitted at one end thereof with a plug, such as plugs 72, 74, and 76, which has a body portion extending into the interior of the tube and a round end portion which abuts the end of the tube and remains outside of the tube when in place (see FIGS. 2 and 9). Each plug is maintained in place by a flexible cap which fits over the tube and maintains a fluid-tight seal; caps 66, 68, and 70 are shown at the ends of tubes 12, 14, and 16. Each plug has a notched or chamfered portion 73 along the body portion of the plug and also has notched portion 75 in the end portion of the plug. These notches in the plug form a channel when the plug is in place inside one end of the tube through which purified water, which collects at one end of the tube, may pass into the interior portion of the tube. Accordingly, the passage of purified fluid is first through the membrane 108, into the grooves between the helical wraps 112, along the parallel channels to the end of the tubing, through the channel 75 formed between the plug end and the end of the tubing, through channel 73 formed between the plug and the interior wall of the tubing, and into the interior 105 of the tubing.

Figure 11:
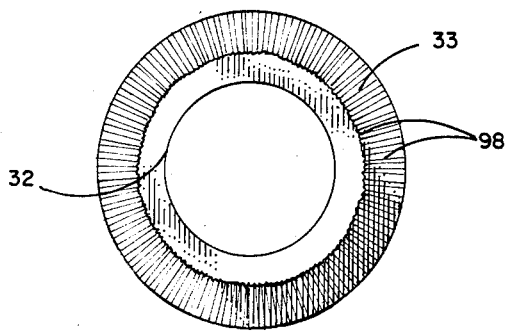
FIG. 11 is a view of a connector showing passageways for purified water.

Because the flow of purified water through a normal reverse osmosis unit is very small, the particular type of plug device used at the end of each tube is not critical; only a small passageway need be provided between the elongate channels which collect the purified water and the interior of the tubing through which the purified water is directed to a collection header as subsequently described. Product water also passes between interior surface of the tubes and the connectors 28, 30, and 32 along a plurality of shallow striations or grooves on the surface of the connectors; these grooves 98 are shown on connector 32 in FIG. 11 along the outer surface of the connector.

If desired, the interior 105 of the membrane element tube may be packed with further purification material, such as granular bacteriostatic activated carbon. Suitable material, which is sold under the name Hygene by Ionics, Inc., is activated carbon having about 1% metallic silver to impart a bacteriostatic effect.

While the membrane tube elements of the invention may be used in any reverse osmosis purification unit, a preferred housing system is shown in FIGS. 1–5 and 10. Referring to FIG. 1, a water purification module or cartridge 1 comprises a housing having a rigid tubular PVC casing 2 and a hollow interior 3. The ends of the tubing are closed off by end plugs 50 and 78. A water inlet tubing 4 having threads 51 is mounted in a bore in end plug 50; impure liquid or brine passes out through a conduit 6 threadedly mounted at 79 in end plug 78. Purified fluid exits the housing through tubing 8 which is threadedly mounted in eccentric bore 62 in end plug 50. The tubing is fastened in place with a conventional threaded tubing fitting 52. Purified liquid passes through tubing 8 to a storage tank. The housing has a nominal diameter of about 3 inches and can be mounted directly in the main water line to a residence, with normal water flow to the residence sweeping the impure liquid away from the exterior surface of the tubes within the casing.

The tubes, which are all designated by numeral 10 in FIG. 1, are shown in more detail in FIG. 2, which is a lengthwise section view of a module or cartridge of the invention. The cartridge as shown hold seven double tubing lengths, five of which are shown in the drawing, three being shown in section. Tubing lengths 12 and 13, 14 and 15, 16 and 17, 18 and 19, and 20 and 21, are respectively joined end-to-end by a series of water-impermeable flexible rubber connecting sleeves, shown in the middle portion of FIG. 2 as sleeves 22, 24, and 26. An additional portion of the tube connecting mechanism are connecting members which fit inside the tube ends and are shown in FIG. 2 as connectors 28, 30, and 32. Each connector comprises a pair of oppositely extending nipples having a centrally located annular ridge, shown as ridge 33 on connecting member 32, and having a thickness approximately equal to the tube diameter. Accordingly, when the ends of two aligned tubes are fit in place over the connecting member, the exterior portion of the tubes forms a smooth exterior surface with the ridge 33. A series of small ridges or channels 98 (see FIG. 11) along the exterior surface of the connector may be used to permit the flow of pure water from the end of the tubes into the interior of the tubes for collection.

Figure 5:
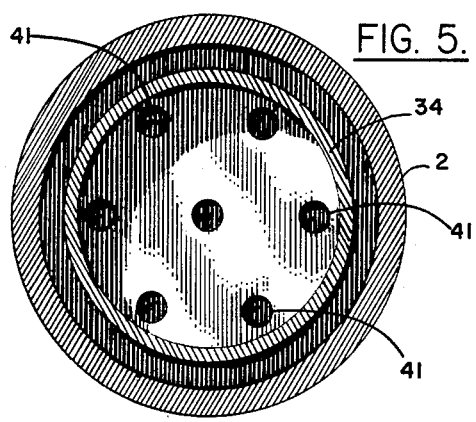
FIG. 5 is a section view of the tubing header taken along section lines 5—5.

The various tubes are mounted at the end opposite the caps and plugs on a rigid molded header 34. The tube has a plurality of nipples, three of which are visible in FIG. 2 as 36, 38, and 40, for receiving ends of the membrane tubes. The tubes fit slideably over the nipples and are held in place by a plurality of flexible rubber sleeve fasteners 44, 45, and 46. The tube ends abut a ledge or ridge 42 when fitted in place over the nipples. The rear portion of the header comprises a sleeve member 48 which forms a recess for receiving the collecting portion of the end plug of the cartridge. A section end view showing the receiving portion of the seven collecting conduits is shown in FIG. 5, with the conduit openings being shown as 41.

The end plug 50 serves as a collector for purified water as well as a closure means for the end of the cartridge. The forward end of the plug, shown in FIG. 4, has a shallow collection chamber defined by an annular ridge or lip 57 which is slightly elevated and abuts the end portion of molded header 34. A concentric similar elevated spacer ridge 59, having a smaller diameter than the exterior ridge, is centrally located on the end of the plug; a slot 58 extending diametrically across the ridge 59 permits water collected interiorly thereof to pass from the central portion 53 into the annular portion of the collecting chamber and out through the channel 60.

The connecting channel 60 (see FIG. 2) extends between the collecting chamber 53 at the end of plug 50 to the purified water outlet 62. A flexible rubber sleeve 64 is mounted in the exit chamber 62 and serves as a simple check valve to prevent purified water from backing up or reentering the cartridge in the event of a failure of water line pressure. The sleeve is sufficiently pliable such that water passing from the cartridge through the channel will deform or compress the sleeve sufficiently to permit water to flow into the outlet chamber around the outsides of the sleeve. However, in the event of a water flow backward from the purified water tank, the interior pressure on the sleeve will force the sleeve against the outlet chamber walls, sealing the opening to the channel 60 and precluding flow back into the cartridge. The purified water outlet chamber is fitted with a conventional threaded fitting 52 which maintains the outlet tubing 8 in place. Purified water flows through outlet tubing 8 to a conventional collection chamber, such as a bladder tank.

Figure 3:
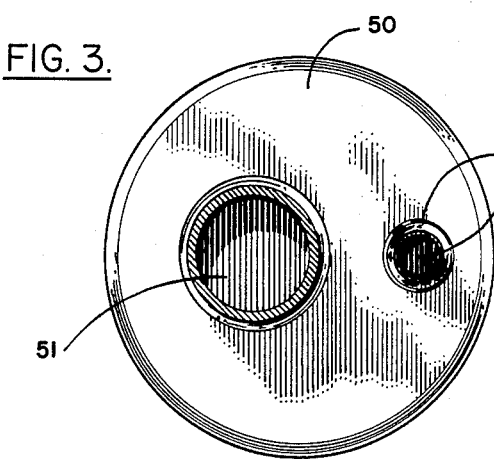
FIG. 3 is a end view of the cartridge showing the water inlet and purified water outlet.
Figure 4:
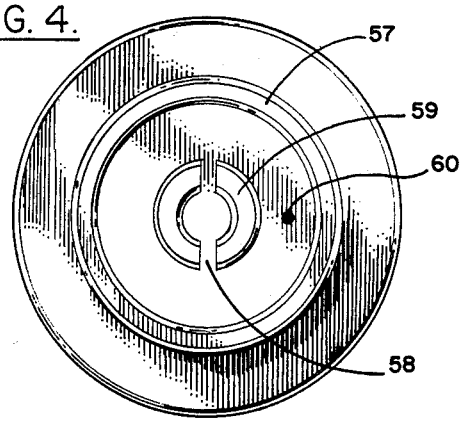
FIG. 4 is an end view of the purified water collector.

End plug 50 also has a slightly offset inlet chamber 51 (see FIG. 3, showing an end view of the plug) which has threads for receiving the end of inlet conduit 4. The path of fluid entering the cartridge through the inlet conduit commences with an immediate radial diversion, moving the fluid to the interior periphery of the cartridge, thereby creating turbulent flow which is helpful to flush any impurities from the surface of the membrane tubes as the purified fluid passes therethrough.

Figure 10:
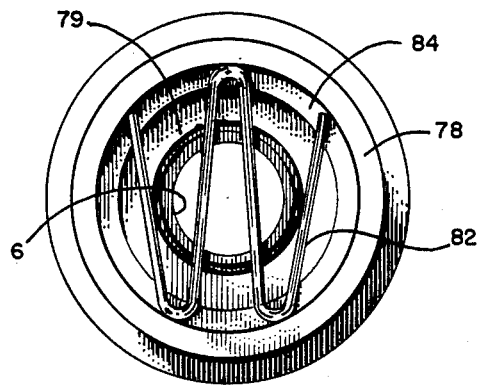
FIG. 10 is an interior view of a cap member used at the impure water exit end of the housing showing the membrane elements support associated therewith.

Brine outlet 79 is a threaded passageway providing an exit from the chamber formed by the housing for water which has passed over the membrane elements. End plug 78, which forms an end wall of chamber 3, also defines a collection chamber 80 for brine which exits the chamber through port 79 and tubing 6. As best seen in FIG. 10, a "W"-shaped spacer, fabricated from heavy wire, is supported on annular ledge 84 in the plug. This spacer permits flow of water through the interior of the unit while providing support for the individual tube elements. When the water purification unit is assembled as shown in FIG. 2, the caps enclosing the tubing ends rest against the spacer, ensuring that no leakage occurs around the edges of the cap.

In the purification process, hard water flows into the unit through tubing 4. Water passes through the membrane supported on each element and into the grooves on the support tubes. Impurities collecting at the membrane surface are swept out of the purification chamber through pipe 6. Purified water travels to and around the end of the tubing and into its interior, eventually traveling to the header and through the purified water conduit 60 to a storage tank.

An alternate cartridge design provides an interior tubing concentric with the exterior housing which serves as an intake conduit and brine exit conduit. The tubing has an interior partition and a plurality of radial apertures; water enters the tubing through one end, exits the radial apertures prior to the partition, travels through the chamber, reenters the tubing downstream of the partition and exits the housing through the other end of the tubing. The membrane elements are mounted annularly around the central entrance/exit tubing. A similar header and collection system is used.

It will be clear to those skilled in the art that many variations and modifications may be made to the apparatus and methods disclosed herein within the spirit and scope of the invention. For example, instead of wrapping the monofilament fiber around the surface of the tubular member, the filament may be extruded directly on the surface of the tubing when the tubing is manufactured. Alternatively, the "filament" support could be formed on the surface of the tubing by cutting the appropriate grooves into the tubing surface with a cutting instrument. The elongate parallel channels may be cut into the plastic tubing with a cutting instrument, or may be formed during extrusion of the tubing. Accordingly, the invention should not be considered limited by the foregoing descriptions of preferred embodiments thereof, but should be considered limited only by the following claims.

I claim:

1. A reverse osmosis water purification unit comprising a hollow cylindrical housing, closure means at each end of the housing, said housing and closure means forming a chamber, an aqueous fluid inlet communicating with the chamber comprising a radially offset bore through one of said closure means, a brine outlet, a purified water outlet, a plurality of hollow tubular reverse osmosis separating elements mounted in the chamber, each element comprising an elongate, straight, rigid, plastic tubular member having a semipermeable membrane disposed around an exterior surface of said member, a plurality of grooves extending along the entire length of said member adapted to carry purified water passing through the membrane, conduit means for conducting said purified water to an interior portion of the element, a manifold having a plurality of mounting members comprising lugs adapted to slideably fit into end portions of the elements, thereby connecting the tubular elements to the manifold, a purified water collection chamber, and second conduit means extending through the mounting member connecting the interior of each tubular element to the purified water collection chamber, and check valve means to preclude flow of purified water from the purified water outlet into the chamber, said check valve means comprising an exit chamber defined by walls having a circular cross-section and having an open end, a flexible sleeve removably mounted in said exit chamber, and an exit bore for conducting purified water from the collection chamber through a wall of the exit chamber radially with said chamber and adjacent said flexible sleeve.

* * * * *